Patented Oct. 3, 1944

2,359,461

UNITED STATES PATENT OFFICE 2,359,461

CHROMANE COMPOUNDS AND MANUFACTURE THEREOF

Robert Behnisch, Wuppertal-Elberfeld, and Walter Salzer, Wuppertal-Barmen, Germany, assignors to Winthrop Chemical Company, Inc., New York, N. Y., a corporation of New York No Drawing. Application November 27, 1940, Serial No. 367,420. In Germany December 2, 1939

8 Claims. (Cl. 260—333)

This invention relates to certain chromane compounds and to a process of preparing the same; more particularly it relates to the products of the general formula

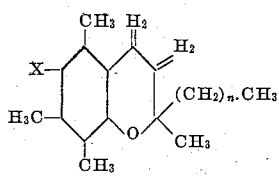

wherein X stands for a substituent of the group consisting of amino and acylamino groups and $n$ stands for one of the numbers 12 to 16, and to the manufacture of such compounds.

In the processes which are hitherto known for the synthetic manufacture of vitamin E, that is 2,5,7,8-tetramethyl-6-hydroxy-2-(4',8',12'-trimethyl-tridecyl)-chromane, phytol and its hydrohalic acid esters or phytadiene have been used as the one of the reacting components. These substances, however, are only difficultly available from natural sources and relatively expensive since they can be made only from vegetable products in a slight yield by a cumbersome process. Experiments, therefore, have been made to replace the vitamin E itself by related compounds of similar chemical constitution, the efficacy of which was expected to be qualitatively and quantitatively similar to that of the natural vitamin. Such experiments, however, were until now unsuccessful, since all such compounds hitherto prepared had a manifoldly decreased activity when compared with the natural vitamin E. This applied particularly to all compounds the aliphatic side chain of which in the 2-position of the chromane ring system deviated from the side chain of the natural vitamin E.

In accordance with the present invention, it has been found that chromane compounds which have a good vitamin E-activity can be obtained by reacting upon a 2,3,5-trimethyl-phenol, the 4-position of which contains a hydroxyl or amino group which may be substituted by acyl groups, with an 1-halogen-butene-2, an 1-hydroxy-butene-2 or a butadiene-1.3, the 3-carbon atom of which compounds is substituted by one of the radicals —$(CH_2)_n.CH_3$, wherein $n$ is one of the numbers 12 to 16. The reaction is advantageously performed in the presence of a usual condensing agent such as zinc chloride and aluminum chloride. The reaction is carried out by heating the reacting components in the presence or absence of an organic solvent such as ligroin, benzene or decahydronaphthalene.

The new products thus obtainable have various advantages when compared with the natural and synthetic vitamin E. Thus they can be prepared much more readily, since the said butene and butadiene substitution products are readily available from the higher fatty acids. The new products thus obtainable are solid crystalline compounds which, therefore, may be used more conveniently in therapeutic preparations such as tablets, pills, granules and the like, than the thickly liquid vitamin E. Furthermore, the new products are much less sensitive to oxygen; whereas vitamin E darkens by oxidation upon standing at the air after a short time, the new products according to the present invention do not change their color even upon prolonged standing at the air.

The butene and butadiene compounds as specified above and used as initial materials are obtained by reacting acetylene and acetylene sodium upon methyl alkyl ketones of suitable structure and by reducing the triple bond of the ethinyl-methyl-alkyl-carbinols formed to a double bond and converting the compounds thus obtained by the action of a hydrohalic acid into the 1-halogen-butene-compounds in which reaction the double bond is rearranged. The products thus obtained may then be saponified to the corresponding 1-hydroxy compounds or converted into the corresponding butadiene compounds by splitting off hydrogen halide.

The invention is furthermore illustrated by the following examples, without being restricted thereto.

Example 1

3 grams of trimethyl-hydroquinone, 5 grams of 3-methyl-3-hexadecyl-1-bromopropene-2 and 2 grams of zinc chloride are slowly heated to 70–80° C. in 50 ccms. of ligroin while stirring and introducing a nitrogen current. The at first vigorous development of hydrogen bromide diminishes after about 30 minutes and has ceased after further 2 hours. The cooled mixture is filtered, the filter residue is washed with ligroin and the filtrate is evaporated under reduced pressure. The residue is dissolved in a mixture of equal parts of ether and petroleum ether, the solution is extracted twice with dilute sodium hydroxide solution and then with water, dried with sodium sulfate and filtered. After evaporation of the solvents a quickly crystallizing, yellowish-white residue remains; it is distilled in vacuo. After short forerunnings the greatest part distils as an almost colorless oil boiling at 235–245° C. under 0.2 mm. pressure (heated in the airbath). The distillate solidifies at once to a crystalline mass melting at 68° C. By dissolving from some alcohol, the 6-hydroxy-2,5,7,8-tetramethyl-2-n-hexadecyl chromane is obtained in colorless crystalline scales melting at 68° C. The absorption spectrum of this compound is almost identical with that of vitamin E. It has a maximum with two tops at about 295 m$\mu$, a minimum at about 257 m$\mu$ and the analogous fine-structure in the maximum.

When using 3-methyl-3-tridecyl-1-bromopropene-2, the 6-hydroxy-2,5,7,8-tetramethyl-2-tridecyl-chromane boiling at 212–220° C. under 0.1 mm. pressure and melting at 58° C. is obtained in an analogous manner; when using 3-methyl-3-pentadecyl-1-bromopropene-2, the 6-hydroxy-2,5,7,8-tetramethyl-2-pentadecyl-chromane boiling at 235–245° C. under 0.2 mm. pressure and melting at 61–62° C.; when using the 3-methyl-3-heptadecyl-1-bromopropene-2, the 6-hydroxy-2,5,7,8 - tetramethyl-2-heptadecylchromane boiling at 235–238° C. under 0.1 mm. pressure and melting at 68° C.

The 6-hydroxy compounds can be converted, for instance, into their esters as follows:

1 gram of 6-hydroxy-2,5,7,8-tetramethyl-2-hexadecyl-chromane is heated with 5 ccms. of methoxy-aceticanhydride for 3 hours to 80–100° C. After evaporation of the excess methoxy-aceticanhydride under reduced pressure, the residue is dissolved with petroleum ether and the solution obtained is shaken several times with water. After drying with sodium sulfate the petroleum ether solution is filtered, evaporated and the residue is distilled in vacuo. The 6 - methoxymethyl-carboxy-2,5,7,8-tetramethyl-2-hexadecyl-chromane is obtained as a light oil distilling at 243–246° C. under 0.1 mm. pressure and solidifying to colorless crystals melting at 50° C. The absorption maximum is shifted to the shorter wave length, when compared with the starting material, and the fine-structure has been more largely spread. Two double-maxima with the tops at 273 and 277 and 282 and 287 m$\mu$ can distinctly be observed. When using instead of methoxy-aceticanhydride acetic or propionic anhydride, the 6-acetoxy- and 6-propionyloxy - 2,5,7,8 - tetramethyl - 2 - hexadecyl-chromanes are obtained.

*Example 2*

5 grams of 4-formylamino-2,3,5-trimethylphenol, 8 grams of 3-methyl-3-tridecyl-1-bromopropene-2 and 3 grams of zinc chloride are heated in 100 ccms. of ligroin for 3 hours to 85° C. while stirring and introducing a nitrogen current. The development of hydrogen bromide has then ceased. After cooling the reaction mixture is filtered from a very small residue and the filtrate is evaporated to dryness under reduced pressure. The viscous residue is dissolved in 100 ccms. of alcohol and the solution is mixed with 20 grams of potassium hydroxide, whereupon a white precipitate of zinc salts is precipitated at once. The alcoholic solution is heated to boiling with the precipitate for several hours, then it is filtered and the filtrate is mixed with petroleum ether and some water. After separation of the petroleum ether layer the alcoholic-aqueous layer is still extracted twice with petroleum ether, the united extracts are washed with water, dried and evaporated. The residue is distilled in vacuo and distils after slight forerunnings as a yellow oil boiling at 238° C. under 0.2 mm. pressure. The distillate solidifies to a yellowish-white crystalline mass melting at 51° C. By dissolving from 85% alcohol the 6-amino-2,5,7,8-tetramethyl-2-tridecyl-chromane is obtained in colorless fatty leaflets melting at 53° C. The absorption spectrum of the compound shows a maximum at 310 m$\mu$ and is almost identical with that of the 6-amino compound of tocopherol.

When working up the reaction mixture before the saponification, the 6-formylamino-2,5,7,8-tetramethyl-2-tridecylchromane melting at 97° C. is obtained.

The same compound is also obtained as follows:

4 grams of 6-amino-2,5,7,8-tetramethyl-2-tridecyl-chromane are heated with 20 ccms. of formic acid for several hours to boiling. After evaporation of the excess formic acid under reduced pressure, the residue is dissolved in petroleum ether, the solution extracted with water, then dried, filtered and evaporated. The residue is distilled in a high vacuum and distils as a water-clear oil boiling at 235–242° C. under 0.15 mm. pressure. The distillate, the 6-formylamino-2,5,7,8-tetramethyl-2-tridecyl - chromane solidifies at once to a colorless crystalline mass melting at 97° C. The absorption spectrum shows a maximum of about 282 m$\mu$ with a distinct fine-structure for a breadth of 278–288 m$\mu$. When using instead of formic acid acetic anhydride, the 6-acetylamino-2,5,7,8-tetramethyl-2-tridecyl-chromane is obtained.

The 6-amino compound can be converted into the 6-hydroxy compound as follows:

1.93 grams of 6-amino-2,5,7,8-tetramethyl-2-tridecyl-chromane are dissolved in 50 ccms. of glacial acetic acid and 2 ccms. of 50% sulfuric acid and diazotized while cooling with a solution of 0.36 gram of sodium nitrite in 2 ccms. of water. A small excess of nitrous acid is destroyed with sulfamic acid and the diazo solution is then poured into a boiling mixture of 150 ccms. of water, 70 ccms. of sulfuric acid and 50 ccms. of chlorobenzene while stirring and introducing a nitrogen current. The decomposition of the diazo group takes place with foaming. After boiling for 10 minutes the mixture is cooled, the chlorobenzene layer is separated and diluted with some petroleum ether. Then the mixture is shaken twice with water, dried and the solvent is evaporated. The residue is distilled in a high vacuum and distils as an orange-yellow oil boiling at 215–220° C. under 0.1 mm. pressure. After having been distilled twice the 6-hydroxy-2,5,7,8-tetramethyl-2-tridecyl - chromane is obtained as a light yellow oil solidifying, when rubbed on, to a yellowish-white crystalline mass melting at 58° C. and being identical with the product described in Example 1.

*Example 3*

3 grams of trimethylhydroquinone, 5 grams of 3-methyl-3-hexadecyl-1-hydroxypropene-2 and 2 grams of zinc chloride are heated to 180° C. in 10 ccms. of decahydronaphthalene in a nitrogen atmosphere for 5 hours. The cooled mixture is treated with petroleum ether, the solution thus obtained is filtered, extracted twice with dilute sodium hydroxide solution and then with water, dried and evaporated. The oily, dark-colored residue is fractionated in a high vacuum. After forerunnings containing besides decahydronaphthalene still transformation products of the unsaturated starting alcohol, the 6-hydroxy-2,5,7,8-tetramethyl-2-hexadecylchromane distils as an almost colorless oil boiling at 235–245° C. under 0.2 mm. pressure. It solidifies upon cooling to a colorless crystalline mass melting at 68° C. The compound is identical with that described in Example 1.

When reacting 3 grams of trimethylhydroquinone with 5.6 grams of 2-hexadecyl-butadiene during 3 hours at 160–180° C., the same compound is obtained.

We claim:

1. A product of the formula

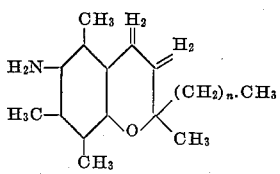

wherein $n$ stands for one of the numbers 12 to 16.

2. The process which comprises reacting upon a 4-acylamino-2-3,5-trimethyl phenol with a compound selected from the group consisting of 1-halogen-butene-2, 1-hydroxy-butene-2 and butadiene-1.3, the 3-carbon atom of which compounds is substituted by one of the radicals —$(CH_2)_n.CH_3$, $n$ being one of the numbers 12 to 16, in the presence of a condensing agent of the group consisting of zinc chloride and aluminium chloride.

3. The process which comprises reacting upon a 4-acylamino-2,3,5-trimethyl phenol with an 1-bromo-butene-2, the 3-carbon atom of which compounds is substituted by one of the radicals —$(CH_2)_n.CH_3$, $n$ being one of the numbers 12 to 16, in the presence of a condensing agent of the group consisting of zinc chloride and aluminium chloride.

4. The process which comprises reacting upon a 4-acylamino-2,3,5-trimethylphenol with a compound selected from the group consisting of 1-halogen-butene-2, 1-hydroxy-butene-2 and butadiene-1.3, the 3-carbon atom of which compounds is substituted by one of the radicals—$(CH_2)_n.CH_3$, $n$ being one of the numbers 12 to 16, in the presence of zinc chloride.

5. The process which comprises reacting upon a 4-acylamino-2,3,5-trimethylphenol with an 1-bromo-butene-2, the 3-carbon atom of which compounds is substituted by one of the radicals —$(CH_2)_n.CH_3$, $n$ being one of the numbers 12 to 16, in the presence of zinc chloride.

6. A product of the formula

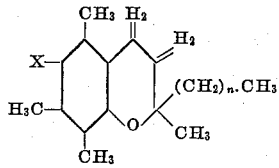

wherein X stands for one of the substituents amino and acylamino, and $n$ stands for one of the numbers 12 to 16.

7. A product of the formula

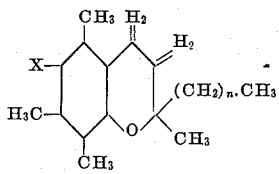

wherein X is an acetylamino group and $n$ is one of the numbers 12 to 16.

8. A product of the formula

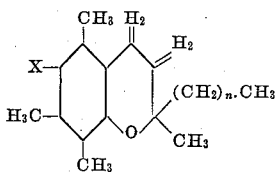

wherein X is a formylamino group and $n$ is one of the numbers 12 to 16.

ROBERT BEHNISCH.
WALTER SALZER.